No. 636,774.　　　　　　　　　　　　　　　Patented Nov. 14, 1899.
J. EDWARDS.
DREDGING VESSEL.
(Application filed Feb. 28, 1899.)
(No Model.)　　　　　　　　　　　　　　　　　　　2 Sheets—Sheet 1.
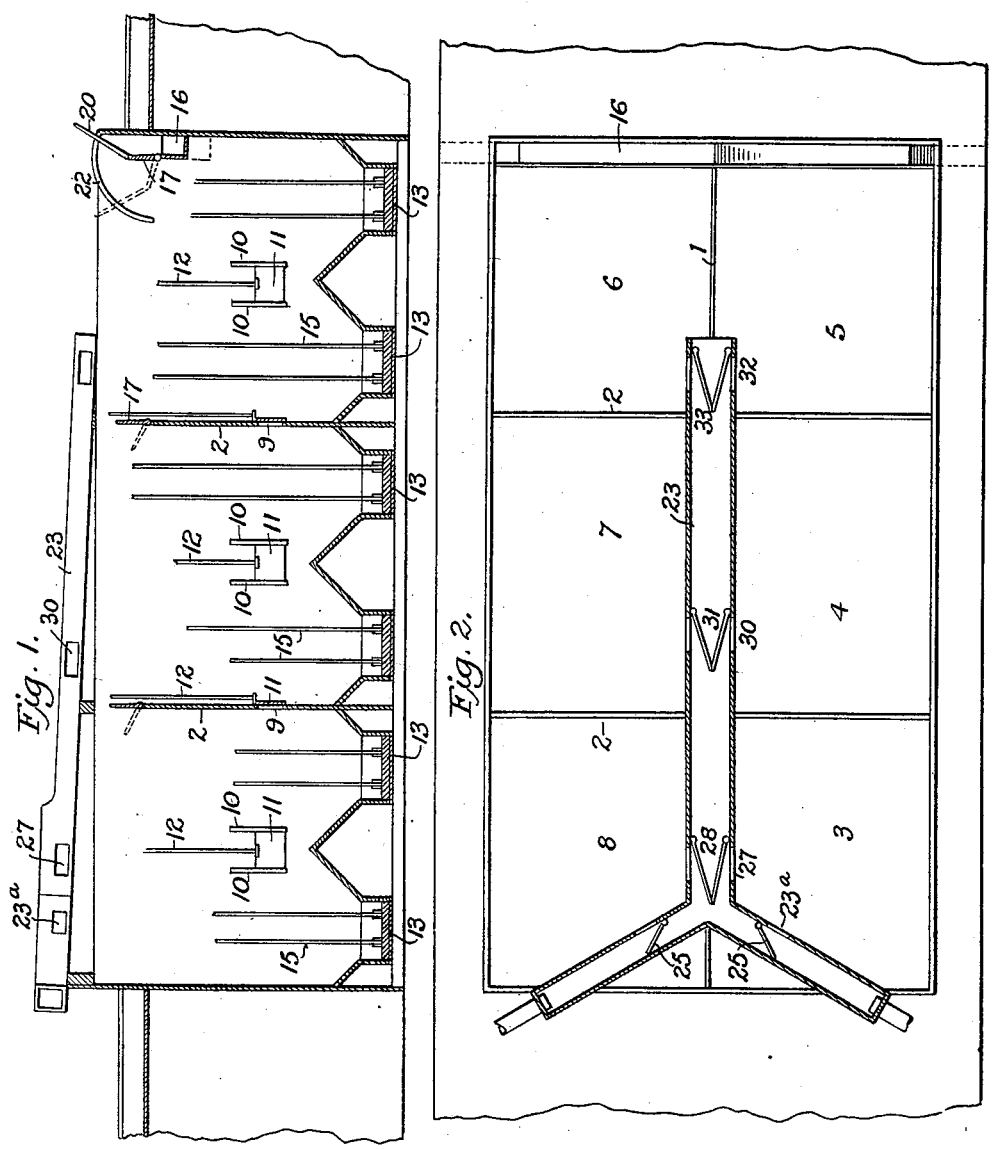
WITNESSES
INVENTOR No. 636,774. Patented Nov. 14, 1899.
J. EDWARDS.
DREDGING VESSEL.
(Application filed Feb. 28, 1899.)
(No Model.) 2 Sheets—Sheet 2.
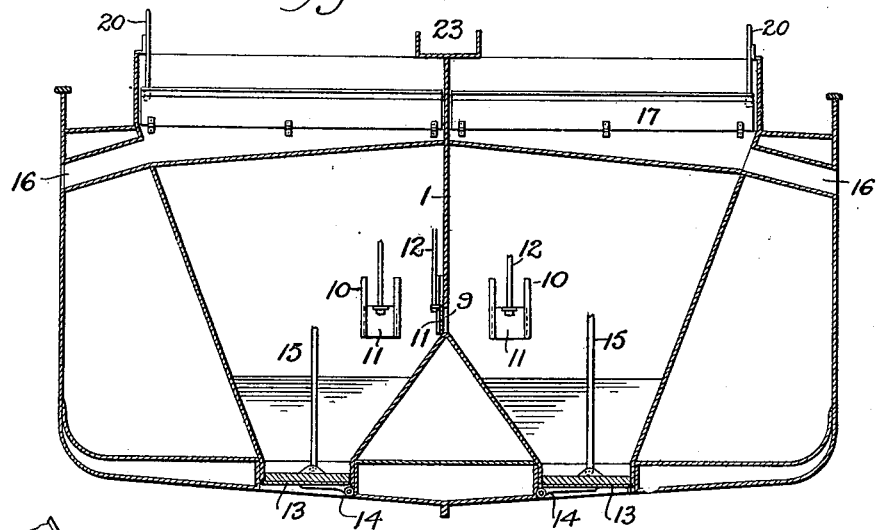
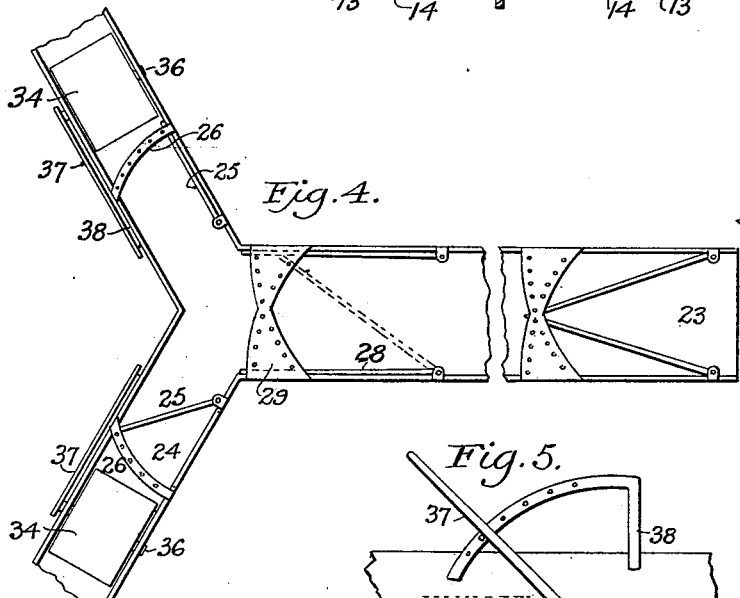
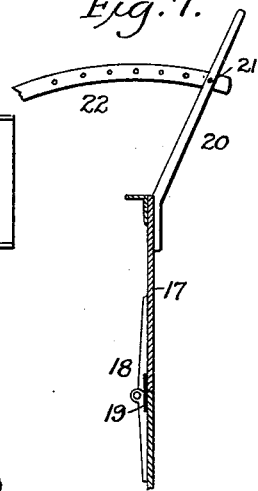
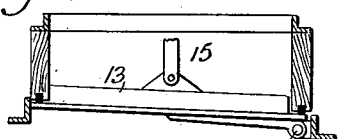
WITNESSES
James F. Duhamel
M. L. Shay
INVENTOR
Joseph B. Edwards
BY
Charles S. Rogus
ATTORNEY

UNITED STATES PATENT OFFICE.

JOSEPH EDWARDS, OF NEW YORK, N. Y.

DREDGING VESSEL.

SPECIFICATION forming part of Letters Patent No. 636,774, dated November 14, 1899.

Application filed February 28, 1899. Serial No. 707,129. (No model.)

*To all whom it may concern:*

Be it known that I, JOSEPH EDWARDS, a citizen of the United States, residing in the city of New York, borough of Brooklyn, in the county of Kings and State of New York, have invented certain new and useful Improvements in Dredging Vessels; and I do hereby declare the following to be a full, clear, and exact description of the invention, such as will enable others skilled in the art to which it appertains to make and use the same.

This invention relates to dredging apparatus, or particularly to an apparatus of this character wherein the material operated upon is received and distributed upon a vessel, also adapted to separate the material received during the distribution thereof.

Some of the objects of the invention are to provide an apparatus of this character wherein the material received can be discharged into any portion of the apparatus during the receiving process and can be uniformly distributed throughout the entire apparatus without in the least retarding the reception of the material upon the apparatus.

Another object is to provide for the discharge of the water, after approximately all of the solid matter conveyed upon the apparatus with the water shall have been removed therefrom, during and by reason of the process of distribution.

A further object of the invention is to retard the flow or velocity of the material received upon the apparatus to produce sedimentation of the solid matter therein and to obstruct the progress of the material toward the final discharge, so that a minimum amount of the solid matter is lost.

Another object of the invention is to prevent the careening and lurching of the vessel during the process of loading the same and when so careened to right the vessel speedily and without interfering with the loading process, and thereby provide for an even distribution of the load and prevent straining of the vessel by an unequal distribution of the load.

With these and other objects in view the invention consists, essentially, in the construction, combination, and arrangements of parts, substantially as hereinafter more fully described in the following specification and illustrated in the accompanying drawings, in which—

Figure 1 is a longitudinal section, partly in elevation, of a portion of the hull of a dredging vessel to which the invention is here illustrated as applied. Fig. 2 is a top plan view of the same. Fig. 3 is a transverse section thereof. Fig. 4 is a detail top plan view, on an enlarged scale, of the flume and gates or doors. Fig. 5 is a partial detail view illustrating one of the bottom gates in the flume and means for operating and regulating the position of same. Fig. 6 is a detail view of one of the bottom discharge-doors of the vessel, illustrating the packing-joint for the same; and Fig. 7 is a detail view of the adjustable trimming-door and means for operating and regulating the position of the same.

Similar characters of reference designate corresponding parts throughout the several views.

In the accompanying drawings my invention is illustrated as applied to a dredging vessel or scow; but it will be understood that the construction of the vessel here shown is illustrated as an exemplification of one form of the apparatus in connection with which my invention may be employed; but any form or construction of apparatus may be used in practice, according to the requirements or conditions under which the invention is used.

The invention is particularly designed or intended for use in loading scows, dredging-steamers, or other vessels, both in still and rough water, in order to provide a maximum load for the vessel employed and in the case of rough or shallow water to provide a means whereby the amount of the load carried by the vessel can be accurately determined and regulated.

The importance of regulating the draft of a dredging vessel to suit different depths of water on ocean or river bars in order to provide a maximum load for the vessel and at the same time to prevent the thumping or pounding of the vessel upon the bar over which it is located during the loading process will be readily understood and the importance of this invention appreciated.

Referring to the drawings, wherein is indicated a portion of the outline of a vessel adapted to receive material removed from subterranean sources, the reference character 1 designates a longitudinal partition or bulkhead, of any preferred form of construction, preferably dividing the vessel or apparatus longitudinally into equal portions, and 2 refers to transverse partitions or weirs, preferably dividing the vessel or apparatus transversely into three portions, and by means of these weirs or partitions are formed bins or compartments 3, 4, 5, 6, 7, and 8. Formed in these partitions or weirs are openings 9, on each side of which are secured guides or ways 10, in which is slidably mounted a gate or valve 11, suitably operated from above by means of a rod 12, and the object of these gates or valves 11 is to provide for an equal and uniform distribution of the water, as the same is first pumped or conveyed upon the apparatus during the process of loading the same. These openings may be located at any height in the partitions or weirs and prevent an excessive accumulation of water in any one or more parts of the vessel or apparatus. Any preferred mechanism may be employed to operate these gates; but they are preferably operated and controlled from the deck of the vessel or apparatus and can be closed when the water has reached the desired uniform height throughout the vessel or apparatus.

The vessel or apparatus is preferably provided with a plurality of dumping-doors 13, of any desired form or construction, desirably hinged at one side thereof to the framework of the vessel or apparatus, as shown at 14 in Figs. 3 and 6 of the drawings, and these doors are preferably let into the bottom of the vessel or apparatus and provided with a packing-joint, as shown in Fig. 6. These dumping-doors may be operated singly or collectively from above by suitable mechanism; but I have here illustrated merely a portion of a connecting-rod 15, which preferably extends above the deck or platform of the vessel or apparatus and may be operated by hand through the medium of a screw-wheel or other device, as desired.

Suitably constructed in one end of the vessel or apparatus, preferably the bow of the former, is an overflow or discharge device 16, preferably consisting of a way or conduit formed on or connected with a vessel or apparatus and having an inclination laterally—that is, toward the sides of the vessel or apparatus—and having the highest point thereof substantially in the longitudinal center of the vessel or apparatus, as clearly shown in Fig. 3 of the drawings. This overflow way or conduit may be of any preferred form or construction and may be located in any desired position upon the vessel or apparatus.

Movably connected with the free edges of the partitions or weirs are what are termed herein "adjustable trimming-doors" 17, designed to regulate and control the amount of the load upon the vessel or apparatus by the position in which said doors are secured.

The weirs or partitions 2 are preferably of different heights—that is to say, that nearer the induction end of the flume is preferably higher than that nearer the eduction end of the same—in order to provide for the retarding of the velocity of the liquid material pumped aboard the vessel or apparatus, and to increase sedimentation, as the material is allowed to weir from one bin or compartment into the other, and finally discharge into the overflow, a minimum amount of solid matter being discharged overboard with the water.

To increase the sedimentation and further retard the flow of the water toward the overflow or discharge, I provide, preferably, adjustable trimming-doors 17, of any preferred form or construction, preferably movably connected with the free edges of the weirs or partitions 2, desirably by means of a hinge connection 18, and I preferably secure a strip or band of flexible material impervious to water along and over the joint or connection between the free edge of the weir and the adjacent edge of the trimming-door, as shown at 19 in Fig. 4, to prevent the passage of the material operated upon through the opening or crack between said parts, and thus prevent the cutting or wearing away of the edges of said parts by the constant passage of the material therebetween. I also preferably employ a strip of said material along the edges of the trimming-doors for the purpose just described, and these strips of material may be secured in any desired manner to the trimming-doors or upon the adjacent portion of the vessel or apparatus.

Formed on or connected with the trimming-doors 17 in any desired manner are levers 20, preferably provided with a plurality of openings or a slot to receive and retain pin or other devices 21, adapted to be inserted through and into a segmental plate or bar 22, secured upon the vessel or apparatus and provided with a plurality of openings to afford adjustment for the trimming-doors, as will be readily understood.

If desired, a ratchet bar or lever may be used, operating with a notched rack-bar to regulate the position of the trimming-doors, or any other preferred mechanism may be employed, and sliding doors or detachable sections may be used instead of hinged doors.

The function and operation of my improved adjustable weirs will be readily understood from the foregoing description and the explanation thereof hereinafter set forth.

Referring particularly to Figs. 2 and 4, I have illustrated an improved means for conveying and distributing the material pumped aboard the vessel or other apparatus, embodying a flume or conduit 23, of any preferred form or construction, but preferably Y-shaped, the branches or forks of the flume communicating with the discharge-pipes of the pump or other device, through which pipes the material is discharged into the branches of the flume. This flume or conduit may be located in any desired position upon a vessel or apparatus, but is here shown as mounted upon the deck or platform of the same. I preferably provide lateral discharge-openings in the flume communicating with or located above the several bins or compartments and provide gates or valves to control such openings, so that the material operated upon can be discharged into any desired bin or compartment by simply operating the gates or doors. I provide an opening 23ª in a branch 24 of the flume and provide a gate or door 25 to control the same, and preferably employ a curved or segmental bar or plate 26, having openings adapted to receive retaining-pins or other devices, which also engage with the door 25 to retain the latter in any preferred position, and when it is desired to discharge the material into the bin 3 the gate or door 25 is secured in the position shown in Figs. 2 and 4, whereby all the material passing through the branch 24 of the flume will be discharged into said bin; but if the door 25 is closed the material passing through the said branch will pass on to and into the main portion 23 of the flume and be discharged through the opening 27 in the main portion of the flume into the bin 4. The opening 27 in the main portion of the flume is preferably provided with a gate or door 28, regulated by a bar or plate 29, and a stop-pin engaging said bar and gate, as before described, and if it is desired to fill the bin 4 the gate 28 is closed and the material is allowed to pass by the same and discharge through the opening 30, controlled by the gate 31, and so on.

The gates or doors and the construction of the flume, as well as the operation thereof, being the same in both branches and being the same on both sides of the flume, it will only be necessary to describe that of one side.

Either the gate 25 may be closed and the gate 28 thrown entirely across the main portion of the flume, thereby discharging the entire volume of material into the bin 3, or the gate 31 may be closed and the gate 33 thrown entirely across the flume, thus discharging the entire contents into bin 5, or vice versa. I may also employ bottom gates 34, controlling openings 35 in the bottom of the branches 24 of the flume, preferably mounted upon a pivot-shaft 36, controlled by lever 37, and the position of the lever 37 may be regulated by the bar 38, having openings therein to receive a stop-pin, also engaging the lever in a manner before described, and when the gate 34 is in a position shown in Fig. 5 water rushing thereover will discharge the heaviest solid material therein through said opening into the bin 3, as will be understood.

The operation of this invention will be readily understood from the foregoing description when taken in connection with the accompanying drawings and the following explanation thereof. The material is pumped aboard the vessel or other apparatus into the branches of the flume and is discharged therefrom into any desired bin or compartment, and if discharged into bins 3 or 8 the liquid will weir up over the adjustable trimming-doors 17 into the adjacent bins 4 and 7 and from thence weir up over said doors and finally weir into the overflow and pass overboard.

From the operation or process herein described it will be understood that the velocity of the material is greatly retarded in the bins 3 and 8 and some sedimentation occurs therein, and such velocity is further retarded by reason of the material being compelled to rise up over the trimming-doors 17 into the adjacent bins 4 and 7, where the velocity is further retarded and further sedimentation takes place, and the same process is repeated until the material is finally discharged into the overflow and permitted to pass overboard; but when so discharged the liquid contains a minimum amount of solid matter.

I do not desire to confine myself to the construction, combination, and arrangement of parts herein shown and described, and I reserve the right to make all such changes in and modifications of the same as come within the spirit and scope of my invention.

What I claim as new, and desire to secure by Letters Patent, is—

1. A dredging apparatus provided with weirs having adjustable portions.

2. A dredging apparatus provided with partitions or divisions, provided with devices for uniformly distributing material throughout the apparatus and adjustable weirs connected with said partitions or divisions.

3. A dredging apparatus provided with adjustable weirs and an overflow to receive the liquid discharge over said weirs.

4. A dredging apparatus provided with weirs having adjustable portions and means for regulating the same to control the maximum load of the apparatus.

5. A dredging apparatus provided with adjustable weirs and means for preventing the ingress of the material between the fixed and movable parts thereof.

6. A flume provided with side discharge-doors and means for retaining the free ends of said doors together to deflect the material toward both sides of the flume.

7. A flume provided with discharge-openings in the bottom thereof, doors or gates pivotally connected intermediate of the length of the same to said flume and means for regulating the inclination of said doors or gates in relation to said bottom so that only the most solid of the matter passing through the flume will be deflected through said openings.

8. A flume provided with discharge-openings in the bottom thereof, intermediately-pivoted doors or gates, a regulating device upon said flume and means connected with said doors and operating with said device to control the deflection of the solid matter only through said opening.

9. A dredging apparatus provided with side and bottom discharge doors or gates, levers connected with said gates, and means above the latter for controlling the movement of said levers.

10. A dredging apparatus provided with a flume, gates controlling the discharge-openings in said flume, levers or cranks connected with said gates and regulating-bars with which said levers are detachably connected to regulate the position of the gates.

11. A dredging apparatus provided with a flume having lateral discharge-openings, gates controlling said openings, means for regulating the gates and bottom gates operating in connection with said lateral gates and means for regulating the former.

12. A branched flume provided with discharge-doors pivotally connected therewith, a lever connected with said pivot and a plate or bar attached to the sides of the flume and carrying a connecting device constructed to engage said lever to regulate the inclination of said doors.

13. A flume provided with discharge-doors movably mounted in the bottom thereof, a lever connected with said doors to regulate the inclination thereof, and a curved bar or plate carrying a device to engage said lever to control the position of the door.

14. A flume provided with branches, bottom discharge doors or gates in said branches and side discharge doors or gates in the main portion and branches of said flume.

15. A flume provided with bottom discharge-doors having means to regulate the position thereof and side discharge-doors constructed to extend partially or entirely across the flume to discharge a portion or all of the material laterally.

16. A flume having openings in the sides thereof, doors or gates therefor and plates or bars above said openings carrying devices, to engage said doors, whereby all or a portion of the material may be discharged through either side of the flume or be allowed to pass on through the flume.

17. A branched flume having openings in the sides of the main and branch portions, doors or gates for said openings, means for regulating the position of said doors, discharge-openings in the bottom of said branches, doors or gates for the latter and means for controlling the position of the last-mentioned doors or gates, whereby all or any portion of the material can be discharged at any desired point.

In testimony whereof I have hereunto affixed my signature in presence of two witnesses.

JOSEPH EDWARDS.

Witnesses:
  CHARLES S. ROGERS,
  M. L. SHAY.